(12) United States Patent
Baker

(10) Patent No.: US 10,438,005 B2
(45) Date of Patent: Oct. 8, 2019

(54) DEVICE, SYSTEM, AND METHOD FOR PROTECTING CRYPTOGRAPHIC KEYING MATERIAL

(71) Applicant: Wind River Systems, Inc., Alameda, CA (US)

(72) Inventor: Arlen Baker, Alameda, CA (US)

(73) Assignee: Wind River Systems, Inc., Alameda, CA (US)

( * ) Notice: Subject to any disclaimer, the term of this patent is extended or adjusted under 35 U.S.C. 154(b) by 355 days.

(21) Appl. No.: 15/483,576

(22) Filed: Apr. 10, 2017

(65) Prior Publication Data

US 2018/0293390 A1 Oct. 11, 2018

(51) Int. Cl.
| | |
|---|---|
| *G06F 21/62* | (2013.01) |
| *G06F 21/60* | (2013.01) |
| *G06F 21/86* | (2013.01) |
| *H04L 9/08* | (2006.01) |
| *G06F 21/57* | (2013.01) |

(52) U.S. Cl.
CPC ............ *G06F 21/602* (2013.01); *G06F 21/57* (2013.01); *G06F 21/6218* (2013.01); *G06F 21/86* (2013.01); *H04L 9/0897* (2013.01); *H04L 2209/127* (2013.01)

(58) Field of Classification Search
CPC .... G06F 21/57; G06F 21/602; G06F 21/6218; G06F 21/86; H04L 9/0897; H04L 2209/127
See application file for complete search history.

(56) References Cited

U.S. PATENT DOCUMENTS 7,802,111 B1 * 9/2010 Tahan ..................... G06F 21/57
380/259
9,367,697 B1 * 6/2016 Roth ...................... G06F 21/602

* cited by examiner

*Primary Examiner* — Minh Dinh
(74) *Attorney, Agent, or Firm* — Fay Kaplun & Marcin, LLP

(57) ABSTRACT

A device, system, and method protects cryptographic keying material. The method is performed at an electronic device including a plurality of components housed in an enclosure. The method includes determining a tamper state of the enclosure, the tamper state being one of a secure state in which the enclosure has not been physically tampered or an unsecure state in which the enclosure has been physically tampered. When the tamper state is the secure state, the method includes associating a first value with the application. When the tamper state is the unsecure state, the method includes associating a second value with the application. The first value is configured to enable access to the data in the data storage unit. The second value prevents access to the data in the data storage unit.

20 Claims, 3 Drawing Sheets

DEVICE, SYSTEM, AND METHOD FOR PROTECTING CRYPTOGRAPHIC KEYING MATERIAL

BACKGROUND INFORMATION

An electronic device may include an enclosure in which the hardware components of the electronic device are housed. The hardware components may include a processor, a storage component, a motherboard, a graphics card, a sound card, etc. The electronic device may have a plurality of programs or applications (i.e., software) installed. For example, the programs may be stored in the storage component and executed by the processor. The programs may utilize any of the hardware components that are available. The electronic device may further have a plurality of hardware/software programs (i.e., firmware) installed.

There are many different ways to secure the electronic device from being improperly accessed with regard to the hardware, the software, the firmware, and a combination thereof. One example in securing the electronic device is a Trusted Platform Module (TPM). The TPM includes a secure cryptoprocessor securing hardware, software, and/or firmware by utilizing cryptographic keys. The cryptographic keys may be securely created such as based on one or more Platform Configuration Registers (PCR) that are substantially incapable of being duped or overridden. Using these cryptographic keys, the hardware/software/firmware may be utilized when the electronic device has been verified as secure. Accordingly, data stored in a storage component may be sealed from access and unsealed using these cryptographic keys.

The electronic device may be subject to different types of malicious attacks to access data stored in the storage component of the electronic device. For example, malware is a software based attack to control various components of the electronic device and access data (e.g., privileged data). In another example, physical tampering to open the enclosure of the electronic device to access the hardware components may allow the data stored in the storage component to be directly accessed. When physical tampering is performed, purely software based security measures may be insufficient to prevent the data from being accessed. In fact, the physical tampering may also affect the manner in which the TPM may provide its features of securing the electronic device.

SUMMARY

The exemplary embodiments are directed to a method, comprising: at an electronic device including a plurality of components housed in an enclosure, the components comprising a data storage unit storing data and a processor configured to execute an application configured to access the data in the data storage unit: determining a tamper state of the enclosure, the tamper state being one of a secure state in which the enclosure has not been physically tampered or an unsecure state in which the enclosure has been physically tampered; when the tamper state is the secure state, associating a first value with the application; and when the tamper state is the unsecure state, associating a second value with the application, wherein the first value is configured to enable access to the data in the data storage unit, and wherein the second value prevents access to the data in the data storage unit.

The exemplary embodiments are directed to an electronic device, comprising: an enclosure; a data storage unit housed in the enclosure, the data storage unit storing data; and a processor configured to execute an application configured to access the data in the data storage unit, the processor further determining a tamper state of the enclosure, the tamper state being one of a secure state in which the enclosure has not been physically tampered or an unsecure state in which the enclosure has been physically tampered, when the tamper state is the secure state, the processor associating a first value with the application, and when the tamper state is the unsecure state, the processor associating a second value with the application, wherein the first value is configured to enable access to the data in the data storage unit, and wherein the second value prevents access to the data in the data storage unit.

The exemplary embodiments are directed to a method, comprising: at an electronic device including a plurality of components housed in an enclosure, the components comprising a data storage unit storing data and a processor configured to execute an application configured to access the data in the data storage unit: receiving a value from the application, the value being one of a first value and a second value, the first value being indicative of a tamper state of the enclosure being a secure state in which the enclosure has not been physically tampered, the second value being indicative of the tamper state of the enclosure being an unsecure state in which the enclosure has been physically tampered; when the first value is received, unsealing the data storage unit for the application to access the data; and when the second value is received, preventing the application from unsealing the data storage unit.

DETAILED DESCRIPTION

Figure 1:
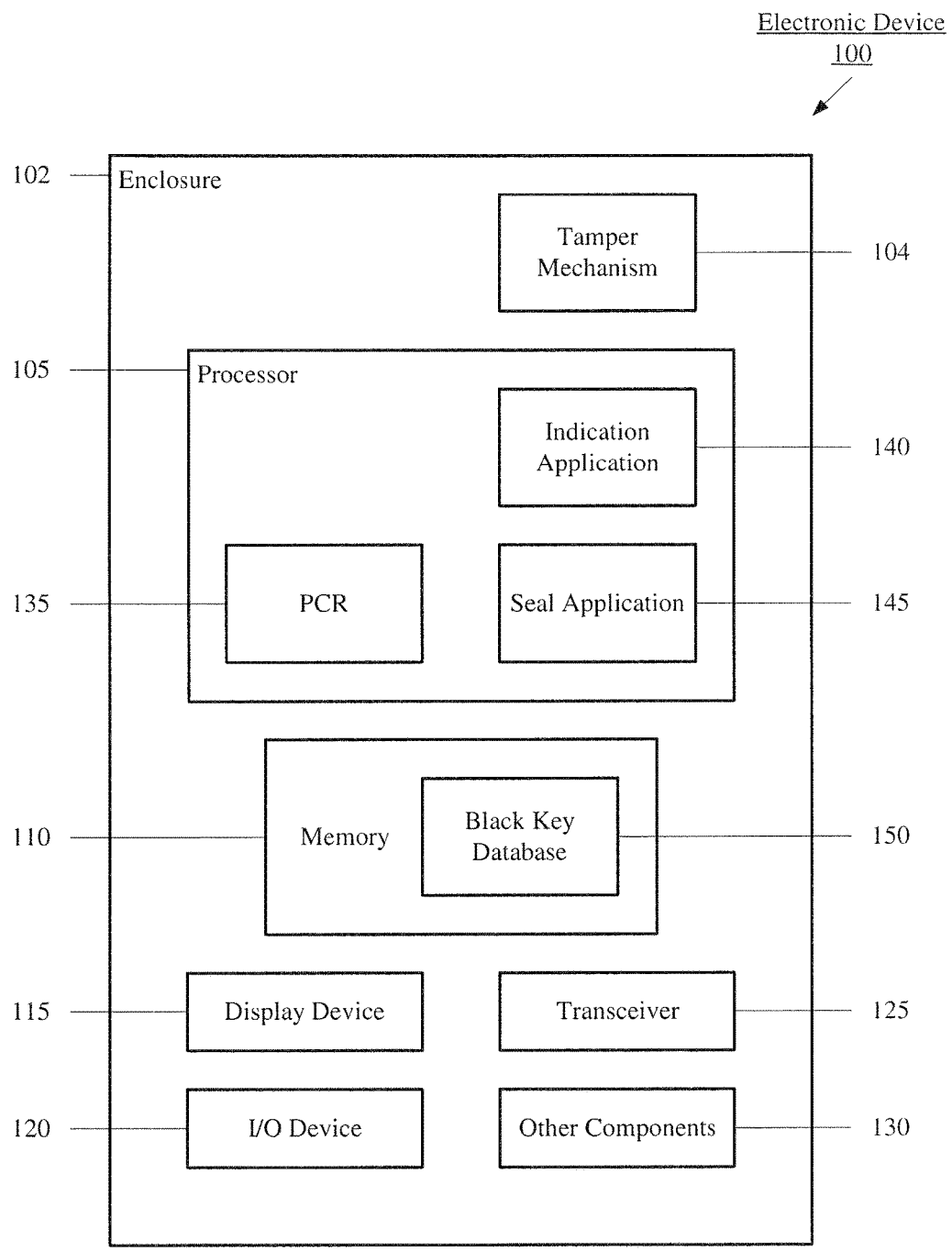
FIG. 1 shows an electronic device according to the exemplary embodiments.

The exemplary embodiments may be further understood with reference to the following description and the related appended drawings, wherein like elements are provided with the same reference numerals. The exemplary embodiments are related to a device, a system, and a method for securing an electronic device by preventing data from being accessed when an enclosure of the electronic device has been tampered with. Specifically, the exemplary embodiments relate to a mechanism in which a tamper indication is utilized to extend a value associated with a data accessor. When the tamper indication indicates that the enclosure has not been tampered with, the value may be extended in a manner that allows the data accessor to unseal the data. However, when the tamper indication indicates that the enclosure has been tampered with, the value may be extended in a manner that prevents the data accessor to unseal the data and keep the data sealed.

The exemplary embodiments are configured to create a Black Key Database to securely store cryptographic keying material as well as controlling how the Black Key Database is accessed. As those skilled in the art will understand, keying material relates to any type of key having any format, length, and amount associated therewith. When the keying material is cryptographic, the cryptographic keying material may relate to data used to determine a functional output of a cryptographic algorithm. The exemplary embodiments may utilize any cryptographic algorithm and operation in generating the cryptographic keying material. As will be described in detail below, the Black Key Database may be any database configured to encrypt the cryptographic keying material, to allow access to the cryptographic keying material only when the electronic device is in a secure state, and to protect the cryptographic keying material from probing if the device is physically accessible. It is noted that those skilled in the art may understand the term "secure state" to be operational specific for the electronic device. However, according to the exemplary embodiments, the secure state may also entail evidence that no physical tampering has occurred.

It is noted that the exemplary embodiments are described with regard to the Black Key Database. That is, the exemplary embodiments are directed to a phase of a security mechanism corresponding to sealing of the data through encryption of the data, protection of the data, and preventing access of the data unless the correct circumstances are identified. In contrast, those skilled in the art will understand that the security mechanism may include another phase in which the Black Key Database is unsealed and becomes a Red Key Database where the data is being accessed and/or manipulated. For illustrative purposes, the exemplary embodiments are described with regard only to the Black Key Database.

It is also noted that the exemplary embodiments being described with regard to a Black Key Database is only exemplary. The Black Key Database may represent any database, storage component, or data repository in which data may be stored and accessed. Accordingly, the exemplary embodiments may be modified to be used with any data storage device in which the data stored therein is to be sealed (e.g., encrypt data, protect the data from unauthorized access, etc.). It is further noted that the exemplary embodiments being described with regard to cryptographic keying material is only exemplary. The exemplary embodiments may also be modified to be used with any type of stored data.

FIG. 1 shows components of an electronic device 100 according to the exemplary embodiments. The electronic device 100 may be configured to execute applications and perform operations using computer-executable instructions. It is noted that the term "applications" may include programs, software, etc. and is used herein inclusively. The electronic device 100 may also be configured with the Black Key Database 150 according to the exemplary embodiments in securing cryptographic keying material. The electronic device 100 may utilize a Trusted Platform Module (TPM) and features thereof. For example, the TPM provides a feature of Platform Configuration Registers (PCR). However, it is noted that the use of the TPM is only exemplary. The exemplary embodiments may be modified to be used with the electronic device 100 utilizing any type of security mechanism.

The electronic device 100 may represent any electronic device such as, for example, a portable device (e.g., a cellular phone, a smartphone, a tablet, a phablet, a laptop, a wearable, etc.), a stationary device (e.g., desktop computer) or an embedded device (e.g., component of an automobile, plane, home appliance, etc.). The electronic device 100 may include an enclosure 102, a tamper mechanism 104, a processor 105 and a memory 110. The electronic device 100 may further optionally include one or more of the following: a display device 115, an input/output (I/O) device 120, a transceiver 125, and other suitable components 130, such as, for example, a portable power supply, an audio I/O device, a data acquisition device, ports to electrically connect the electronic device 100 to other electronic devices, etc.

The enclosure 102 may be any physical housing in which the components of the electronic device 100 is wholly or partially housed. For example, the processor and the memory 110 may be wholly housed within the enclosure 102. In another example, the electronic device 100 may include a graphics card, a sound card, a modem, etc. that are partially housed in the enclosure 102. Specifically, a portion of these components may be exposed to an exterior such that an adaptor or other coupling component may be attached to these components.

The enclosure 102 may be opened and closed. For example, the enclosure 102 may include a first part and a second part that couple together to form the enclosure 102. In a specific example of when the electronic device 102 is a desktop computer where the enclosure 102 is a tower, the first part may be a base while the second part may be a coupled to the base. The first and second parts may be coupled to one another using locking components (e.g., screws). In another specific example of when the electronic device 100 is a smartphone, the first part may be a front side and the second part may be a back side that are coupled to one another. The front and back sides may also be coupled to one another using locking components (e.g., latches). As those skilled in the art will understand, the enclosure 102 may be designed to prevent the enclosure 102 from being opened except by authorized individuals. For example, opening the enclosure 102 and accessing the hardware components of the electronic device 100 may void a warranty of the electronic device 100. In another example concerning an embedded device, the electronic device 100 may be components of a braking system of an automobile that may be within the enclosure 102 so that only authorized service providers may have access.

The tamper mechanism 104 may be configured to determine whether a physical tampering has occurred on the electronic device 100. For example, the tamper mechanism 104 may determine whether the enclosure 102 has been opened. In another example, the tamper mechanism 104 may determine whether any type of physical interference has taken place (e.g., an unauthorized connection is established with a hardware component of the electronic device 100). The tamper mechanism 104 may also be configured to determine whether an attempt at physical tampering has occurred (e.g., although the enclosure 102 is unopened, there is evidence that someone has attempted to open the enclosure 102). In this manner, the tamper mechanism 104 may be of a variety of types—resistance type, evidence type, detection type, or response type. The tamper mechanism 104 may be positioned on or in the enclosure 102 or the components of the electronic device 100 to detect the physical tampering. Those skilled in the art will understand that the tamper mechanism 104 may be placed in such a way that a user may be incapable of accessing the tamper mechanism 104 without first physically tampering with the electronic device 100.

The tamper mechanism 104 may perform the determination in a physical manner, an electronic manner, or a combination thereof. In a first example, the tamper mechanism 104 may be physically attached to a first and second side of the enclosure 102 such that a separation of the first and second sides causes the tamper mechanism 104 to indicate a physical tampering. Specifically, in this scenario, the tamper mechanism 104 may be a tamper tape (e.g., conductive or resistive tape that has different electrical characteristics when it is removed from its original position)

placed inside the enclosure 102. In a second example, the tamper mechanism 104 may be an electronic monitor or sensor that detects whenever a physical tampering (or attempt) has been performed.

Regardless of how the tamper mechanism 104 performs its functionality of determining physical tampering, the tamper mechanism 104 may be configured to generate a signal. The signal may indicate whether the electronic device 100 has undergone a physical tampering or has remained in a secure state. The signal from the tamper mechanism 104 may be generated in a variety of manners. In a first example, the signal may be a Boolean value. Thus, a "0" signal may indicate that no physical tampering has occurred whereas a "1" signal may indicate that physical tampering has occurred. In a second example, the signal from the tamper mechanism 104 may be more complex. For example, the tamper mechanism 104 may include a mechanism to perform a calculated, random, and/or repeatable (i.e., capable of being used multiple times) value to indicate the presence or absence of physical tampering. Those skilled in the art will appreciate that using a more complex signal from the tamper mechanism 104 may further ensure that no outside influences have affected the signal that is to be used by subsequent components of the electronic device 100 (e.g., deter hacking of the signal from the tamper mechanism 104).

The processor 105 may be configured to execute computer-executable instructions for operations from a plurality of applications that provide various functionalities to the electronic device 100. For example, the plurality of applications may include a PCR 135, an indication application 140, and a seal application 145. As will be described in further detail below, the PCR 135 may be used to identify the state of the electronic device 100 as an application attempts to access sealed data. The indication application 140 may interpret the signal from the tamper mechanism 104 to identify the state of the electronic device 100. The seal application 145 may operate with the indication application 140 to generate an extension for the PCR 135 to seal/unseal the data.

It should be noted that the processor 105 according to the exemplary embodiments may represent a secured hardware, software, and/or firmware application that is executed to provide the functionalities described herein. That is, the processor 105 may be a combination of functionalities that create and maintain the Black Key Database 150. Accordingly, the processor 105 may be a secure hardware, software, and/or firmware application that performs the functionalities as will be described in detail below. As a secure application, the processor 105 may be prevented from being accessed or with whose functionalities may not be interfered. In this manner, the inputs and outputs of the processor 105 may be assumed to be correct and provide a trusted operation.

It should also be noted that the applications executed by the processor 105 are only exemplary. As noted above, the applications may be operations or functionalities of an application represented as the processor 105. In another example, the functionalities described for the applications and the processor 105 may also be represented as a separately incorporated component of the electronic device 100 (e.g., an integrated circuit with or without firmware), or may be a modular component coupled to the electronic device 100. In this manner, the security and trust of the processor 105 may be maintained without interference from other software components that may be malicious. The functionalities may also be distributed throughout multiple components of the electronic device 100.

The memory 110 may be a hardware component configured to store data related to the functionalities performed by the electronic device 100. As noted above, the memory 110 may represent any storage location for data. The memory 110 may further include the Black Key Database 150 that stores cryptographic keying material. It is noted that the memory 110 may be part of a storage arrangement that may include other types of storage components or may be a stand-alone storage unit for the purposes of the exemplary embodiments.

The display device 115, the I/O device 120, and the transceiver 125 may provide conventional functionalities. Specifically, the display device 115 may be a hardware component configured to provide to a user a visual representation corresponding to the data. The I/O device 120 may be a hardware component configured to receive inputs from the user and output corresponding data. The transceiver 125 may enable a connection or a communication to be established between the electronic device 100 and another electronic device.

According to the exemplary embodiments, the PCR 135 may include substantially similar functionalities and features as used in TPMs. As noted above, the electronic device 100 may utilize the TPM. However, it is again noted that the use of the TPM is only exemplary and the exemplary embodiments may be utilized and/or modified for other security mechanisms utilized by the electronic device 100. The TPM may be a security mechanism that securely generates cryptographic keys in a manner in which the cryptographic keys are limited in their usage. The TPM may include further functionalities such as remote attestation (e.g., generating a summary of the hardware and application configuration of the electronic device 100 used to verify whether applications have been changed), binding (e.g., encrypting data using a binding key), and sealed storage (e.g., encrypting (sealing) data using a binding key while specifying the secure state of the electronic device for the data to be decrypted (unsealed)). The electronic device 100 may utilize any version of TPM (e.g., TPM 1.0, TPM 2.0, etc.).

A feature of the TPM is the PCR (e.g., the PCR 135). The PCR may be used for the attestation functionality of the TPM. Specifically, the PCR may be used to cryptographically record or measure an application state (e.g., both the applications running on a platform and configuration data used by these applications). The PCR may be used in an update calculation termed an "extend". The extend may be a one-way hash such that application measurements may be prevented from being removed. The PCRs may then be read to report the application state. When the report has more security associated therewith, the attestation may be generated. As those skilled in the art will understand, the PCRs are configured to measure the application state. As will be described in further detail below, an interpretation of the application state as measured by the PCRs may be performed by the exemplary embodiments, particularly with regard to physical tampering of the enclosure 102.

The TPM may utilize a plurality of PCRs. For example, the TPM may utilize 24 total PCRs (numbered 0 to 23). As those skilled in the art will understand, the first 8 PCRs (#0 to 7) may be reserved for system critical operations such as a BIOS, a master boot record, a ROM configuration, etc. Another 8 PCRs (#8 to 15) may be used for a static operating system. The remaining 8 PCRs (#16 to 23) may be used by other applications of the electronic device 100. For illustrative purposes, it may be assumed that only the first 8 PCRs are reserved with the remaining 16 PCRs being utilized for user selected installed applications (including the operating system).

The extend update calculation may utilize various PCR values. Initially, the TPM may authenticate hardware components of the electronic device (e.g., from physical tampering) using the PCRs. The TPM may include a unique integrated circuit chip that also has a unique and secret binding key associated therewith (e.g., burned onto the chip during manufacture). Using this unique binding key, the TPM may be capable of performing platform authentication. Accordingly, the TPM may push the security to the hardware level in conjunction with software of the TPM to provide improved protection over a software-only solution. With the unique binding key, the PCR values may also be generated.

The PCR values may be generated by an ordered update calculation of the PCRs. For example, starting with PCR #0, the TPM may generate a PCR value (using the binding key). As noted above, the PCR value may represent an application state. Thereafter, the PCR value may be extended. Specifically, with PCR #1, the TPM may generate extension data (also using the binding key) that is to be applied to the PCR value (currently only calculated using PCR #0). The TPM may then generate a new PCR value as a digest of the old PCR value and the extension data. This process may continue until all PCRs have been accounted for and the final PCR value is a representation of a summary of the entire application state. Accordingly, the first PCR value from the first PCR #0 may be extended until the final PCR value incorporating the last PCR (e.g., PCR #23).

The above extension operation may enable the TPM to provide a secure manner of generating the attestation that represents the summary of the application state. Accordingly, without any outside influence, the TPM may utilize the application state as a means of determining a state of the electronic device 100. However, even when the electronic device 100 utilizes the TPM with the unique binding key, the binding key may still be susceptible to being attacked or obtained while an application that has obtained the binding key from TPM is using it to perform encryption/decryption operations (e.g., a cold boot attack). The binding key or the contents of the Black Key Database 150 may also be susceptible when the hardware components are accessed via physical tampering.

Returning to the electronic device 100 illustrated in FIG. 1, the PCR 135 may be any of the PCRs described above. For illustrative purposes, it may be assumed that the PCR 135 is not one of the first eight PCRs #0 to 7. That is, the PCR 135 may not be one of the system critical operations/applications. Instead, the PCR 135 may represent one of the user selected installed applications. However, it is noted that this is only exemplary and the PCR 135 may also be one of the first eight PCRs or is one of the system critical operations/applications. As will be described herein, the PCR 135 may relate to an application that may utilize the Black Key Database 150. That is, the application may attempt to access the Black Key Database 150.

As noted above, the indication application 140 may interpret the signal from the tamper mechanism 104 to identify the state of the electronic device 100. The indication application 140 may relate to a first aspect of the exemplary embodiments. Specifically, the first aspect relates to sealing the Black Key Database from unauthorized applications. Accordingly, only PCRs that indicate a secure state (via the PCR value) may unseal the Black Key Database. Therefore, PCRs that indicate an unsecure state (via the PCR value) may be incapable of unsealing the Black Key Database 150.

According to the exemplary embodiments, the Black Key Database 150 may utilize the operations associated with the TPM but may further incorporate a mechanism to alter the manner that the PCR value of the PCR 135 is extended based on whether physical tampering has been identified. As described above, the TPM may be configured to always utilize the associated unique binding key to generate the PCR and the extension data. However, the exemplary embodiments are configured to utilize alternate data when a physical tampering has been identified (e.g., replace using the unique binding key). As described above, the physical tampering may be indicated by the tamper mechanism 104. The tamper mechanism 104 may detect the state of the enclosure and generate a tamper signal that is forwarded to the indication application 140. The indication application 140 may interpret the tamper signal and determine the presence or absence of any physical tampering to the enclosure 102. The indication application 140 may then transmit an interpreted tamper signal to the seal application 145.

As noted above, the seal application 145 may operate with the indication application 140 to generate an extension for the PCR 135 to seal/unseal the data. The seal application 145 may also relate to the first aspect of the exemplary embodiments. Upon receiving the interpreted tamper signal from the indication application 140, the seal application 145 may determine whether the unique binding key is to be used in a conventional manner to generate the extension data for the PCR 135 or to utilize alternate extension data for the PCR 135. Specifically, the seal application 145 may utilize the unique binding key when the interpreted tamper signal indicates an absence of physical tampering whereas the seal application 145 may utilize an alternate calculation when the interpreted tamper signal indicates the presence of physical tampering.

By dynamically selecting the manner in which the PCR value is extended with the extension data, the application state of the electronic device 100 may also be dynamically set based on whether there has been any physical tampering. With no physical tampering, a conventional operation in which the unique binding key may be used such that the PCR value may be extended to maintain an application state that indicates a secure state. However, with physical tampering, the conventional operation is overridden and the PCR value is extended with alternate extension data such that the application state indicates an unsecure state.

The above first aspect may be performed for each application or PCR in which access to the Black Key Database 150 is to be prevented (e.g., remain sealed to the application). For example, when physical tampering is detected, a user selected installed application may be prevented from accessing the Black Key Database 150. This application may correlate to PCR #23. Thus, when the PCR value is extended with respective extension data from the previous PCRs #0 to 22 and assuming none of these previous PCRs #0 to 22 are to be prevented from accessing the Black Key Database 150, the seal application 145 may utilize the unique binding key. However, when extending the PCR value for the PCR #23, the seal application 145 may utilize alternate extension data. The resulting PCR value incorporating the extension data of the PCR #23 may thereby indicate an unsecure state such that when the application attempts to access the Black Key Database 150 with its associated PCR value, an unsecure state is determined and the application is blocked from unsealing the Black Key Database 150.

In another example, especially when a plurality of PCRs are to be prevented from accessing the Black Key Database 150, the seal application 145 may utilize different manners of preventing the unsealing of the Black Key Database 150 through using the alternate extension data. In a first example, the seal application 145 may utilize the alternate extension data for each individual PCR that is to be prevented from accessing the Black Key Database 150. In a second example, the seal application 145 may utilize a lowest PCR to utilize the alternate extension data. By using the lowest PCR, all subsequent PCR values will incorporate the alternate extension data. Accordingly, even if the subsequent PCR values are extended using extension data based on the unique binding key, the application state may still be indicated as an unsecure state.

The exemplary embodiments may also include a second aspect in which the PCR 135 (or the application represented thereby) is attempting to access the Black Key Database 150. As described in detail above, the PCR 135 may have an associated PCR value which is a digest of previous PCR values that have been extended with an immediately subsequent extension data. The PCR value of the PCR 135 may have been extended with conventional extension data based on the unique binding value (when no physical tampering is detected) or extended with an alternate extension data (when physical tampering is detected). Thus, when the PCR 135 attempts to unseal the Black Key Database 150, the PCR value associated therewith may be used. When the TPM determines that the PCR value indicates a secure state of the application state of the electronic device 100, the PCR 135 (and the associated application) may unseal the Black Key Database 150 (resulting in the Red Key Database). However, when the TPM determines that the PCR value indicates an unsecure state, the PCR 135 (and the associated application) may be prevented from unsealing the Black Key Database 150.

Figure 2:
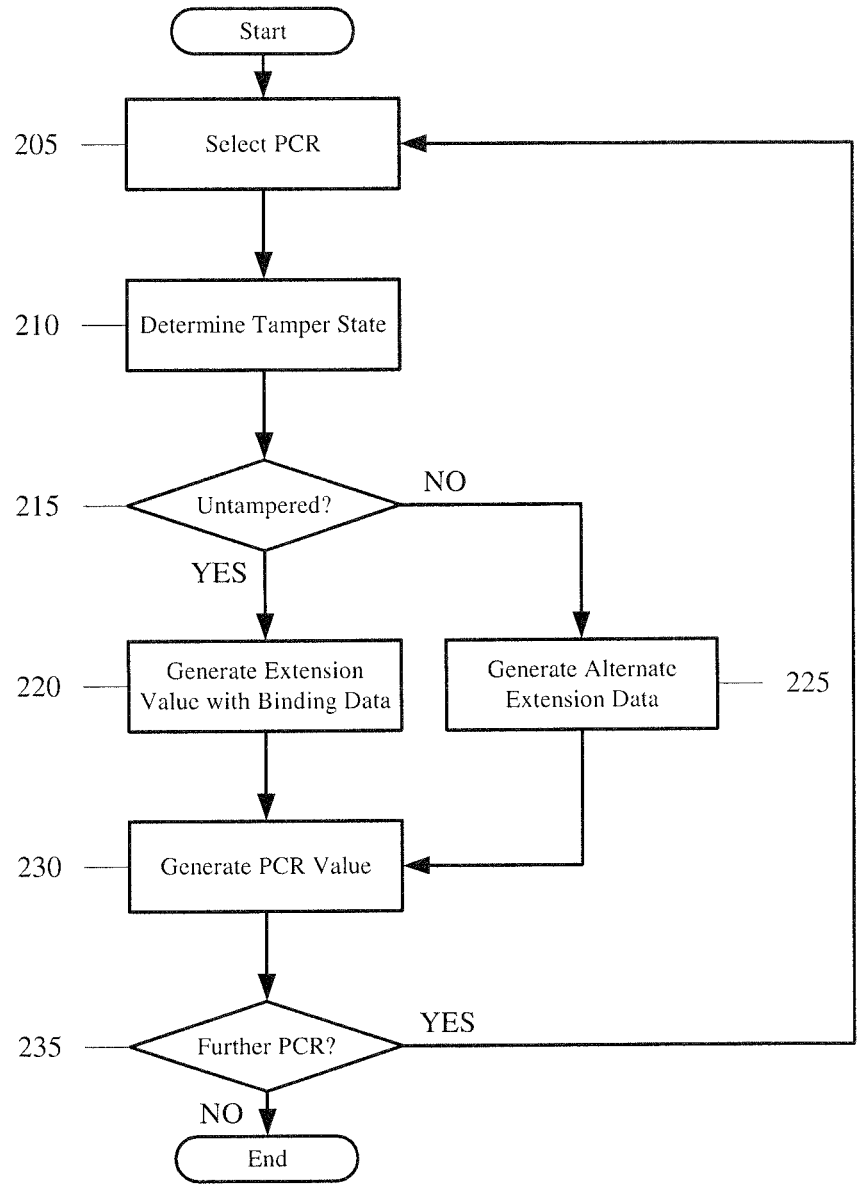
FIG. 2 shows a method for securing data according to the exemplary embodiments.

FIG. 2 shows a method 200 for securing the Black Key Database 150 from unauthorized PCRs and associated applications according to the exemplary embodiments. The method 200 relates to the first aspect of the exemplary embodiments including operations performed by the tamper mechanism 104 and the processor 105, specifically the indication application 140 and the seal application 145. It may be assumed that the PCR 135 is a PCR that the TPM has selected to be blocked from accessing the Black Key Database 150 when a physical tampering has been detected. It may also be assumed that the PCR 135 is not a system critical operation/application. The method 200 will be described with regard to the electronic device 100 of FIG. 1.

In 205, the seal application 145 selects a PCR. For example, the PCR may be the PCR 135. In a first example, the selected PCR may be chosen based on whether a physical tampering indication is to affect the manner in which the resulting PCR value is to be extended for the selected PCR. In a second example, the selected PCR may be chosen based on whether the PCR and the application the PCR represents is to be prevented from accessing the Black Key Database 150. In a third example, a combination of the above examples may be used. As will be described below in 235, the seal application 145 may select more than one PCR.

In 210, the tamper mechanism 104 generates a tamper signal that is transmitted to the indication application 140. The indication application 140 interprets the tamper signal to determine whether a physical tampering has occurred to the enclosure 102. Accordingly, the tamper state may be identified where a presence of a physical tampering corresponds to an unsecure state while an absence of a physical tampering corresponds to a secure state. The indication application 140 may transmit an interpreted tamper signal to the seal application 145 that indicates whether a physical tampering has occurred.

In 215, the seal application 145 determines whether the interpreted tamper signal indicates a physical tampering to the enclosure 102. If the seal application 145 determines that there has been no physical tampering, the seal application 145 continues the method 200 to 220. However, if the seal application 145 determines that there has been a physical tampering, the seal application 145 continues the method 200 to 225.

In 220, the seal application 145 generates an extension data using the unique binding key of the TPM as burned onto the TPM chip. Accordingly, a conventional mechanism of generating the extension value may be used. In contrast, in 225, the seal application 145 generates an alternate extension data based on a different algorithm or calculation. When the seal application 145 generates the alternate extension data, the seal application 145 may be configured with a functionality to ensure that the alternate extension data does not coincidentally match the extension data as would be generated with the unique binding key. In this exemplary embodiment, the extension data based on the unique binding key correlates to a secure state while the alternate extension data correlates to an unsecure state.

In 230, the seal application 145 generates a PCR value for the selected PCR 135 based on the extension data or the alternate extension data. As described above, the PCR value may be generated based on a previous PCR value and the extension data or the alternate extension data. For example, PCR #0 may be based on the extension data only. PCR #1 may be based on the PCR value of the PCR #0 and the extension data for the PCR #1. The PCR #17 may be based on the PCR value of the PCR #0 to 16 and the extension data for the PCR #17. Again, by creating the PCR value based on the extension data, the PCR 135 may correspond to an application state that is in the secure state. By creating the PCR value based on the alternate extension data, the PCR 135 may correspond to an application state that is in the unsecure state.

In 235, the processor 105 may determine whether there are any further PCRs to which the extension data may require a respective alternate extension data. The method 200 relates to an exemplary embodiment where each PCR selected to have the extension data dynamically generated based on the presence of a physical tampering has a respective alternate extension data generated. However, the method 200 may be modified for when further PCRs are selected to have the extension data dynamically selected. For example, the seal application 145 may already be aware that a physical tampering has occurred if the determination from 215 indicates this tamper state. Thus, the method 200 may return to 225. In another example, the seal application 145 may determine a level of the PCR and any further PCRs. If the seal application 145 determines that a lowest PCR (e.g., closest to PCR #0) whose extension data is to be replaced with the alternate extension data has already occurred, all remaining selected PCRs already have this incorporated in the PCR value. Thus, the method 200 may end.

Figure 3:
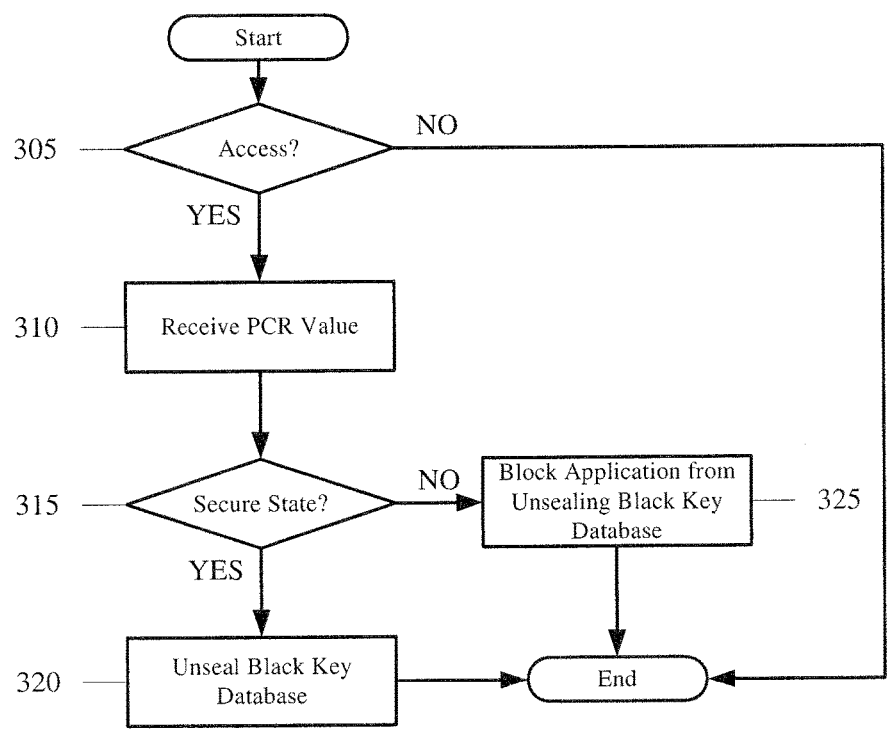
FIG. 3 shows a method for accessing data according to the exemplary embodiments.

FIG. 3 shows a method 300 for accessing/unsealing or blocking/sealing the Black Key Database 150 according to the exemplary embodiments. The method 300 relates to the second aspect of the exemplary embodiments including operations performed by the PCR 135 and the TPM utilized by the electronic device 100. It may again be assumed that the PCR 135 is a PCR that the TPM has selected to be blocked from accessing the Black Key Database 150 when a physical tampering has been detected. The method 300 will be described with regard to the electronic device 100 of FIG. 1.

In 305, the TPM determines if an access to the Black Key Database 150 is being attempted. If no attempt is being made, the method 300 ends. However, if an access is attempted, the method 300 continues to 310. In 310, a PCR (e.g., the PCR 135) provides its associated PCR value generated as described in the method 200. In 315, the TPM determines whether the PCR value corresponds to a secure state. If the PCR value corresponds to a secure state (generated with the extension data based on the unique binding key of the TPM), the method 300 continues to 320. In 320, the TPM unseals the Black Key Database 150 (and turns into the Red Key Database). However, if the PCR value corresponds to an unsecure state (generated with the alternate extension data), the method 300 continues to 325. In 325, the PCR 135 and/or the associated application, is blocked from unsealing the Black Key Database 150.

It is again noted that the exemplary embodiments being described with regard to a Black Key Database and an electronic device utilizing a TPM is only exemplary. The exemplary embodiments may be utilized and/or modified to be used with any database, storage component, or data repository in which data may be stored, accessed/unsealed, and blocked/sealed. The exemplary embodiments may also be utilized and/or modified to be used with any security mechanism in which a physical tampering results in an alternate process to be utilized to indicate the respective state of the electronic device.

The exemplary embodiments provide a device, system, and method to generate a Black Key Database and controlling how the Black Key Database is sealed or unsealed. Upon creating the Black Key Database, the cryptographic keying material thereof may be sealed and only unsealed when a secure state is identified. The determination of whether the Black Key Database is unsealed may be based on a value (e.g., PCR value) indicative of the state of the electronic device. By dynamically determining how the value is generated and associating this value to an access of data (e.g., a PCR or associated application), the accessor may be granted or denied access to the Black Key Database.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   at an electronic device including a plurality of components housed in an enclosure, the components comprising a data storage unit storing data and a processor configured to execute an application configured to access the data in the data storage unit:
   determining a tamper state of the enclosure, the tamper state being one of a secure state in which the enclosure has not been physically tampered or an unsecure state in which the enclosure has been physically tampered;
   when the tamper state is the secure state, associating a first value with the application; and
   when the tamper state is the unsecure state, associating a second value with the application,
   wherein the first value is configured to enable access to the data in the data storage unit, and
   wherein the second value prevents access to the data in the data storage unit.

2. The method of claim 1, wherein the electronic device utilizes a Trusted Platform Module (TPM).

3. The method of claim 2, wherein the first and second values are Platform Configuration Register (PCR) values.

4. The method of claim 3, wherein the application corresponds to one of the PCRs of the TPM.

5. The method of claim 4, wherein the associating the first value with the application comprises:
   receiving a prior PCR value associated with an immediately previous PCR relative to the one of the PCRs;
   generating an extension data based on a unique binding key associated with the TPM; and
   generating the first value based on the prior PCR value and the extension data.

6. The method of claim 5, wherein the associating the second value with the application comprises:
   receiving the prior PCR value associated with an immediately previous PCR relative to the one of the PCRs;
   generating an alternate extension data that is different from the extension data; and
   generating the second value based on the prior PCR value and the alternate extension data.

7. The method of claim 1, wherein the determining the tamper state of the enclosure comprises:
   receiving a tamper signal from a tamper mechanism coupled to the enclosure; and
   determining the tamper state based on the tamper signal.

8. The method of claim 7, wherein the tamper signal is one of a Boolean value, a calculated value, a random value, and a repeatable value.

9. The method of claim 1, wherein the data storage unit is a Black Key Database storing cryptographic keying material.

10. The method of claim 4, wherein the one of the PCRs is one of a PCR #8 to #23.

11. An electronic device, comprising:
    an enclosure;
    a data storage unit housed in the enclosure, the data storage unit storing data; and
    a processor configured to execute an application configured to access the data in the data storage unit, the processor further determining a tamper state of the enclosure, the tamper state being one of a secure state in which the enclosure has not been physically tampered or an unsecure state in which the enclosure has been physically tampered, when the tamper state is the secure state, the processor associating a first value with the application, and when the tamper state is the unsecure state, the processor associating a second value with the application,
    wherein the first value is configured to enable access to the data in the data storage unit, and wherein the second value prevents access to the data in the data storage unit.

12. The electronic device of claim 11, wherein the electronic device utilizes a Trusted Platform Module (TPM).

13. The electronic device of claim 12, wherein the first and second values are Platform Configuration Register (PCR) values.

14. The electronic device of claim 13, wherein the application corresponds to one of the PCRs of the TPM.

15. The electronic device of claim 14, wherein, for the associating the first value with the application, the processor:
receives a prior PCR value associated with an immediately previous PCR relative to the one of the PCRs;
generates an extension data based on a unique binding key associated with the TPM; and
generates the first value based on the prior PCR value and the extension data.

16. The electronic device of claim 15, wherein, for the associating the second value with the application, the processor:
receives the prior PCR value associated with an immediately previous PCR relative to the one of the PCRs;
generates an alternate extension data that is different from the extension data; and
generates the second value based on the prior PCR value and the alternate extension data.

17. The electronic device of claim 11, further comprising:
a tamper mechanism coupled to the enclosure, the tamper mechanism generating a tamper signal, the tamper signal being transmitted to the processor,
wherein the processor determines the tamper state based on the tamper signal.

18. The electronic device of claim 17, wherein the tamper signal is one of a Boolean value, a calculated value, a random value, and a repeatable value.

19. The electronic device of claim 11, wherein the data storage unit is a Black Key Database storing cryptographic keying material.

20. A method, comprising:
at an electronic device including a plurality of components housed in an enclosure, the components comprising a data storage unit storing data and a processor configured to execute an application configured to access the data in the data storage unit:
receiving a value from the application, the value being one of a first value and a second value, the first value being indicative of a tamper state of the enclosure being a secure state in which the enclosure has not been physically tampered, the second value being indicative of the tamper state of the enclosure being an unsecure state in which the enclosure has been physically tampered;
when the first value is received, unsealing the data storage unit for the application to access the data; and
when the second value is received, preventing the application from unsealing the data storage unit.

\* \* \* \* \*